(12) United States Patent
Iwasaki et al.

(10) Patent No.: US 8,571,786 B2
(45) Date of Patent: Oct. 29, 2013

(54) VEHICULAR PERIPHERAL SURVEILLANCE DEVICE

(75) Inventors: Masahiro Iwasaki, Numazu (JP); Jun Sakugawa, Gotenba (JP); Shinichi Nagata, Yokohama (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/375,509

(22) PCT Filed: Jun. 2, 2009

(86) PCT No.: PCT/JP2009/060063
§ 371 (c)(1),
(2), (4) Date: Dec. 1, 2011

(87) PCT Pub. No.: WO2010/140215
PCT Pub. Date: Dec. 9, 2010

(65) Prior Publication Data
US 2012/0078498 A1    Mar. 29, 2012

(51) Int. Cl.
*G08G 1/16* (2006.01)
(52) U.S. Cl.
USPC ........... 701/300; 701/301; 701/302; 340/903; 340/435; 340/436
(58) Field of Classification Search
None
See application file for complete search history.

(56) References Cited

U.S. PATENT DOCUMENTS 5,343,206 A * 8/1994 Ansaldi et al. ............... 342/70
5,479,173 A * 12/1995 Yoshioka et al. ............ 342/70
5,529,138 A * 6/1996 Shaw et al. .................. 180/169
5,689,264 A * 11/1997 Ishikawa et al. .............. 342/70
5,818,355 A * 10/1998 Shirai et al. .................. 340/903
5,926,117 A    7/1999 Gunji et al.
5,949,366 A * 9/1999 Herrmann ..................... 342/72
5,964,822 A * 10/1999 Alland et al. ................. 701/301

(Continued)

FOREIGN PATENT DOCUMENTS

DE         102 31 557        7/2003
DE     10 2007 042 792       3/2009

(Continued)

OTHER PUBLICATIONS

Office Action for German Appl. No. 112009004844.7 dated Dec. 7, 2012.

(Continued)

*Primary Examiner* — Jonathan M. Dager
(74) *Attorney, Agent, or Firm* — Finnegan, Henderson, Farabow, Garrett & Dunner, LLP

(57) ABSTRACT

A vehicular peripheral surveillance device includes an obstacle recognition sensor which monitors an obstacle around a host vehicle, a lane recognition sensor and a vehicle state quantity sensor which detect the traveling state of the host vehicle, and a risk computing unit which predicts the movement of the obstacle using information acquired by the obstacle recognition sensor, and computes a risk of the obstacle to the host vehicle on the basis of the predicted movement of the obstacle. The risk computing unit changes the prediction range of the movement of the obstacle on the basis of the traveling state of the host vehicle detected by the lane recognition sensor and the vehicle state quantity sensor. Therefore, the situation of the host vehicle is predicted taking into consideration the movement of the obstacle, thereby realizing computation with high precision while reducing a computation load.

9 Claims, 14 Drawing Sheets

(56) References Cited

U.S. PATENT DOCUMENTS

| | | | |
|---|---|---|---|
| 6,014,601 A * | 1/2000 | Gustafson | 701/45 |
| 6,185,499 B1 | 2/2001 | Kinoshita et al. | |
| 6,195,157 B1 | 2/2001 | Yamashita et al. | |
| 6,202,027 B1 * | 3/2001 | Alland et al. | 701/301 |
| 6,223,117 B1 | 4/2001 | Labuhn et al. | |
| 6,265,991 B1 * | 7/2001 | Nishiwaki et al. | 340/903 |
| 6,269,307 B1 * | 7/2001 | Shinmura et al. | 701/301 |
| 6,338,022 B1 * | 1/2002 | Shinmura et al. | 701/301 |
| 6,502,034 B1 | 12/2002 | Miller | |
| 6,571,176 B1 * | 5/2003 | Shinmura et al. | 701/301 |
| 6,611,227 B1 * | 8/2003 | Nebiyeloul-Kifle et al. | 342/173 |
| 6,721,659 B2 * | 4/2004 | Stopczynski | 701/301 |
| 6,784,828 B2 * | 8/2004 | Delcheccolo et al. | 342/70 |
| 6,810,132 B1 * | 10/2004 | Umezaki et al. | 382/104 |
| 6,856,906 B2 | 2/2005 | Winner et al. | |
| 6,859,731 B2 * | 2/2005 | Takafuji et al. | 701/301 |
| 6,889,140 B2 | 5/2005 | Isogai et al. | |
| RE38,870 E * | 11/2005 | Hall | 701/301 |
| 7,030,775 B2 * | 4/2006 | Sekiguchi | 340/903 |
| 7,069,146 B2 | 6/2006 | Yamamura et al. | |
| 7,071,868 B2 * | 7/2006 | Woodington et al. | 342/70 |
| 7,212,905 B2 * | 5/2007 | Grill | 701/96 |
| 7,610,121 B2 * | 10/2009 | Nishira et al. | 701/1 |
| 7,626,533 B2 * | 12/2009 | Cong et al. | 342/70 |
| 7,830,242 B2 * | 11/2010 | Meister et al. | 340/425.5 |
| 7,840,330 B2 * | 11/2010 | Heinrichs-Bartscher | 701/96 |
| 7,904,246 B2 * | 3/2011 | Kondoh et al. | 701/301 |
| 7,961,084 B2 | 6/2011 | Aso et al. | |
| 7,974,784 B2 * | 7/2011 | Moriizumi et al. | 701/301 |
| 8,055,445 B2 * | 11/2011 | Schiffmann et al. | 701/301 |
| 8,090,537 B2 * | 1/2012 | Nishira et al. | 701/301 |
| 8,170,739 B2 * | 5/2012 | Lee | 701/25 |
| 8,244,408 B2 * | 8/2012 | Lee et al. | 700/301 |
| 8,290,637 B2 * | 10/2012 | Krupadanam et al. | 701/1 |
| 8,305,254 B2 * | 11/2012 | Nanami | 342/70 |
| 2001/0039472 A1 * | 11/2001 | Isogai et al. | 701/96 |
| 2002/0022927 A1 * | 2/2002 | Lemelson et al. | 701/301 |
| 2002/0049539 A1 * | 4/2002 | Russell et al. | 701/301 |
| 2002/0107637 A1 * | 8/2002 | Okamura et al. | 701/301 |
| 2003/0065432 A1 * | 4/2003 | Shuman et al. | 701/48 |
| 2004/0090117 A1 * | 5/2004 | Dudeck et al. | 303/191 |
| 2004/0193347 A1 | 9/2004 | Harumoto et al. | |
| 2004/0239509 A1 * | 12/2004 | Kisacanin et al. | 340/575 |
| 2005/0063565 A1 * | 3/2005 | Nagaoka et al. | 382/104 |
| 2005/0197770 A1 | 9/2005 | Schiffmann et al. | |
| 2005/0288844 A1 | 12/2005 | Kimura et al. | |
| 2006/0149462 A1 * | 7/2006 | Sawamoto et al. | 701/207 |
| 2006/0190175 A1 * | 8/2006 | Moriizumi et al. | 701/301 |
| 2007/0043502 A1 * | 2/2007 | Mudalige et al. | 701/207 |
| 2007/0106431 A1 | 5/2007 | Tsuzuki et al. | |
| 2007/0219695 A1 * | 9/2007 | Chiu et al. | 701/51 |
| 2007/0276600 A1 * | 11/2007 | King et al. | 701/301 |
| 2008/0065328 A1 * | 3/2008 | Eidehall et al. | 701/301 |
| 2008/0189040 A1 | 8/2008 | Nasu et al. | |
| 2008/0243389 A1 | 10/2008 | Inoue et al. | |
| 2008/0303696 A1 * | 12/2008 | Aso et al. | 340/935 |
| 2009/0024357 A1 * | 1/2009 | Aso et al. | 702/181 |
| 2009/0037052 A1 | 2/2009 | Ogasawara et al. | |
| 2009/0187290 A1 * | 7/2009 | Moriizumi et al. | 701/1 |
| 2009/0292468 A1 * | 11/2009 | Wu et al. | 701/301 |
| 2009/0319113 A1 * | 12/2009 | Lee | 701/25 |
| 2010/0100324 A1 * | 4/2010 | Caminiti et al. | 701/301 |
| 2010/0106418 A1 * | 4/2010 | Kindo et al. | 701/300 |
| 2010/0121576 A1 * | 5/2010 | Aso et al. | 701/301 |
| 2011/0298603 A1 * | 12/2011 | King et al. | 340/436 |
| 2011/0313664 A1 | 12/2011 | Sakai et al. | |
| 2012/0022716 A1 * | 1/2012 | Kitahama et al. | 701/1 |
| 2012/0035846 A1 * | 2/2012 | Sakamoto et al. | 701/301 |
| 2012/0059789 A1 * | 3/2012 | Sakai et al. | 706/52 |
| 2012/0065841 A1 * | 3/2012 | Nagata et al. | 701/36 |
| 2012/0218093 A1 * | 8/2012 | Yoshizawa et al. | 340/435 |

FOREIGN PATENT DOCUMENTS

| | | |
|---|---|---|
| EP | 1 332 910 | 8/2003 |
| JP | 5-266399 | 10/1993 |
| JP | 2000-137900 | 5/2000 |
| JP | 2000-242898 | 9/2000 |
| JP | 2002-307972 | 10/2002 |
| JP | 2003-228800 | 8/2003 |
| JP | 2004-106588 | 4/2004 |
| JP | 2005-82124 | 3/2005 |
| JP | 2005-135018 | 5/2005 |
| JP | 2007-151107 | 6/2007 |
| JP | 2007-257519 | 10/2007 |
| JP | 2008-117082 | 5/2008 |
| JP | 2008-191781 | 8/2008 |
| JP | 2008-195289 | 8/2008 |
| JP | 2008-296641 | 12/2008 |

OTHER PUBLICATIONS

U.S. Office Action for U.S. Appl. No. 12/312,001 dated Jun. 8, 2012.
International Search Report in International Application No. PCT/JP2009/060063; Mailing Date: Sep. 15, 2009.
Office Action in U.S. Appl. No. 12/312,001; Notification Date: Oct. 11, 2011.
Translation of the International Preliminary Report on Patentability for PCT/JP2009/060063, dated Dec. 22, 2011.

* cited by examiner

*Fig.9*

| ROAD TYPE | MAXIMUM NUMBER OF PROCESSIONS |
|---|---|
| EXPRESSWAY | 1 |
| HIGHWAY | 1 |
| PUBLIC ROAD SUBURBAN AREA | 1 |
| PUBLIC ROAD URBAN AREA | 2 |

VEHICULAR PERIPHERAL SURVEILLANCE DEVICE

CROSS-REFERENCE TO RELATED APPLICATIONS

This application is a national phase application of International Application No. PCT/JP2009/060063, filed Jun. 2, 2009, the contents of which are incorporated herein by reference.

TECHNICAL FIELD

The present invention relates to a vehicular peripheral surveillance device, and in particular, to a vehicular peripheral surveillance device which predicts the movement of an obstacle being monitored and computes a risk of the obstacle to a host vehicle on the basis of the predicted movement of the obstacle.

BACKGROUND ART

In the related art, a device is suggested which predicts the movement of an obstacle being monitored and computes a risk of the obstacle to a host vehicle on the basis of the predicted movement of the obstacle. For example, Patent Literature 1 describes a traveling control plan evaluation device which evaluates safety of a traveling control plan of an automatic driving vehicle. The traveling control plan evaluation device of Patent Literature 1 includes an action estimation unit which estimates the potential action of a vehicle around the automatic driving vehicle at a certain time, a presence position prediction unit which predicts the presence position of a peripheral vehicle from a certain time on the basis of the presence position of the peripheral vehicle at a certain time and the action estimated by the action estimation unit, and an evaluation unit which evaluates safety of a traveling control plan on the basis of the presence position of the peripheral vehicle predicted by the presence position prediction unit and the presence position based on the traveling control plan of the automatic driving vehicle.

The action estimation unit estimates the action of the peripheral vehicle on the basis of at least road shape information. Thus, the traveling control plan evaluation device of Patent Literature 1 can estimate the potential action of the peripheral vehicle on the basis of information regarding lane ends, curves, or the like.

CITATION LIST

Patent Literature

[Patent Literature 1] Japanese Unexamined Patent Application Publication No. 2008-117082

SUMMARY OF INVENTION

Technical Problem

However, according to the above-described technique, when estimating the potential action of the peripheral vehicle, the computation load of the device may increase or computation may not be performed with high precision depending on the situation of the host vehicle or the number of peripheral vehicles.

The invention has been finalized in consideration of the above-described situation, and an object of the invention is to provide a vehicular peripheral surveillance device capable of realizing computation with high precision while reducing a computation load.

Solution to Problem

A vehicular peripheral surveillance device according to an aspect of the invention includes a monitoring sensor which monitors an obstacle around a host vehicle, a state detection unit which detects any one of the traveling state of the host vehicle, the state of the traveling environment of the host vehicle, and the state of the driver of the host vehicle, and a risk computing unit which predicts the movement of the obstacle being monitored by the monitoring sensor using information acquired by the monitoring sensor, and computes a risk of the obstacle to the host vehicle on the basis of the predicted movement of the obstacle. The risk computing unit changes the prediction range of the movement of the obstacle on the basis of any one of the traveling state of the host vehicle, the state of the traveling environment of the host vehicle, and the state of the driver of the host vehicle detected by the state detection unit.

With this configuration, the vehicular peripheral surveillance device includes the monitoring sensor which monitors an obstacle around the host vehicle, the state detection unit which detects any one of the traveling state of the host vehicle, the state of the traveling environment of the host vehicle, and the state of the driver of the host vehicle, and the risk computing unit which predicts the movement of the obstacle being monitored by the monitoring sensor using information acquired by the monitoring sensor, and computes a risk of the obstacle to the host vehicle on the basis of the predicted movement of the obstacle. The risk computing unit changes the prediction range of the movement of the obstacle on the basis of any one of the traveling state of the host vehicle, the state of the traveling environment of the host vehicle, and the state of the driver of the host vehicle detected by the state detection unit. Therefore, the movement of the obstacle is predicted taking into consideration the situation of the host vehicle, thereby realizing computation with high precision while reducing a computation load.

In this case, it is preferable that the risk computing unit changes the use range of the information acquired by the monitoring sensor on the basis of any one of the traveling state of the host vehicle, the state of the traveling environment of the host vehicle, and the state of the driver of the host vehicle detected by the state detection unit.

With this configuration, the risk computing unit changes the use range of the information acquired by the monitoring sensor on the basis of any one of the traveling state of the host vehicle, the state of the traveling environment of the host vehicle, and the state of the driver of the host vehicle detected by the state detection unit. Therefore, it is possible to prevent the information acquired by the monitoring sensor from being redundantly used, thereby realizing computation with higher precision while reducing a computation load.

It is preferable that, when the monitoring sensor is monitoring a plurality of obstacles, the risk computing unit sets priority on the obstacles on the basis of any one of the traveling state of the host vehicle, the state of the traveling environment of the host vehicle, and the state of the driver of the host vehicle detected by the state detection unit, and predicts the movement of the obstacles in accordance with the priority.

With this configuration, when the monitoring sensor is monitoring a plurality of obstacles, the risk computing unit sets priority on the obstacles on the basis of any one of the traveling state of the host vehicle, the state of the traveling environment of the host vehicle, and the state of the driver of the host vehicle detected by the state detection unit, and predicts the movement of the obstacles in accordance with the priority. Even when the monitoring sensor is monitoring a plurality of obstacles, it is possible to prevent the information acquired by the monitoring sensor from being redundantly used, thereby realizing computation with higher precision while further reducing a computation load.

It is preferable that the risk computing unit sets a natural number n, predicts the movement of an n-th obstacle which is around an (n−1)th obstacle and more distant from the host vehicle than the (n−1)th obstacle and also predicts the movement of the (n−1)th obstacle on the basis of the predicted movement of the n-th obstacle, and sequentially predicts the movement of (n−2)th to first obstacles on the basis of the movement of (n−1)th to second obstacles in the same manner.

With this configuration, the risk computing unit sets the natural number n, and sequentially predicts the movement of the (n−1)th to first obstacles at a shorter distance from the host vehicle on the basis of the movement of the n-th to second obstacles at a longer distance from the host vehicle in processions, making it possible to realize computation with higher precision.

In this case, it is preferable that the risk computing unit sequentially predicts the movement of the n-th to first obstacles while changing the natural number n on the basis of any one of the traveling state of the host vehicle, the state of the traveling environment of the host vehicle, and the state of the driver of the host vehicle detected by the state detection unit.

With this configuration, the risk computing unit sequentially predicts the movement of the n-th to first obstacles while changing the natural number n on the basis of any one of the traveling state of the host vehicle, the state of the traveling environment of the host vehicle, and the state of the driver of the host vehicle detected by the state detection unit. Therefore, the prediction range of the movement of the obstacles in processions from an object distant from the host vehicle changes depending on the traveling state of the host vehicle or the like, thereby realizing computation with higher precision while further reducing a computation load.

It is preferable that the risk computing unit sets priority on a plurality of first obstacles around the host vehicle on the basis of any one of the traveling state of the host vehicle, the state of the traveling environment of the host vehicle, and the state of the driver of the host vehicle detected by the state detection unit, and sequentially predicts the movement of the n-th to first obstacles while changing the natural number n in accordance with the priority.

With this configuration, the risk computing unit sets priority on a plurality of first obstacles around the host vehicle on the basis of any one of the traveling state of the host vehicle, the state of the traveling environment of the host vehicle, and the state of the driver of the host vehicle detected by the state detection unit, and sequentially predicts the n-th to first obstacles while changing the natural number n in accordance with the priority. Therefore, even when there are a plurality of obstacles around the host vehicle, the prediction range of the movement of the obstacles in processions from an object distant from the host vehicle changes depending on the priority, thereby realizing computation with higher precision while further reducing a computation load.

In this case, it is preferable that the risk computing unit sequentially predicts the movement of the n-th to first obstacles while setting the natural number n to be greater for a first obstacle having high priority.

With this configuration, the risk computing unit sequentially predicts the movement of the n-th to first obstacles while setting the natural number n to be greater for the first obstacle having high priority. Therefore, the prediction range of the movement of the obstacles in processions from an obstacle distant from the host vehicle increases for an obstacle having high priority, thereby realizing computation with higher precision while further reducing a computation load.

It is preferable that the vehicular peripheral surveillance device further includes an other-vehicle information receiving unit which enables the reception of information from another vehicle as the obstacle, and the risk computing unit predicts the movement of another vehicle on the basis of information received by the other-vehicle information receiving unit from another vehicle.

With this configuration, the vehicular peripheral surveillance device further includes an other-vehicle information receiving unit which enables the reception of information from another vehicle as the obstacle. The risk computing unit predicts the movement of another vehicle on the basis of information received by the other-vehicle information receiving unit from another vehicle. Therefore, the movement of another vehicle is predicted in accordance with information acquired from the host vehicle and information from another vehicle, thereby realizing computation with higher precision while further reducing a computation load.

It is preferable that the vehicular peripheral surveillance device further includes a road information acquisition unit which acquires information regarding a road on which the host vehicle is traveling, and the risk computing unit changes the prediction range of the movement of the obstacle on the basis of the information regarding the road, on which the host vehicle is traveling, acquired by the road information acquisition unit.

With this configuration, the vehicular peripheral surveillance device further includes a road information acquisition unit which acquires information regarding a road on which the host vehicle is traveling. The risk computing unit changes the prediction range of the movement of the obstacle on the basis of the information regarding the road, on which the host vehicle is traveling, acquired by the road information acquisition unit. Therefore, it becomes possible to estimate the potential action of another vehicle on the basis of information regarding lane ends, curves, or the like.

In this case, it is preferable that the road information acquisition unit acquires information regarding a road shape around the host vehicle, and the risk computing unit predicts the movement of the obstacle as another vehicle on the basis of information acquired by the monitoring sensor and the information regarding the road shape around the host vehicle acquired by the road information acquisition unit.

With this configuration, the road information acquisition unit acquires information regarding a road shape around the host vehicle, and the risk computing unit predicts the movement of the obstacle as another vehicle on the basis of information acquired by the monitoring sensor and the information regarding the road shape around the host vehicle acquired by the road information acquisition unit. Therefore, it becomes possible to estimate the potential action of another vehicle on the basis of information regarding lane ends, curves, or the like.

In this case, it is preferable that the vehicular peripheral surveillance device further includes a scheduled traveling information acquisition unit which acquires information regarding a road on which another vehicle will travel, and the risk computing unit predicts the movement of another vehicle on the basis of the information regarding the road, on which another vehicle will travel, acquired by the scheduled traveling information acquisition unit.

With this configuration, the vehicular peripheral surveillance device further includes a scheduled traveling information acquisition unit which acquires information regarding a road on which another vehicle will travel. The risk computing unit predicts the movement of another vehicle on the basis of the information regarding the road, on which another vehicle will travel, acquired by the scheduled traveling information acquisition unit. Therefore, it is possible to realize computation with higher precision while further reducing a computation load.

Advantageous Effects of Invention

According to the vehicular peripheral surveillance device of the invention, it is possible to realize computation with high precision while reducing a computation load.

BRIEF DESCRIPTION OF DRAWINGS

FIG. 9 is a table showing a maximum number of processions set for each road type.

DESCRIPTION OF EMBODIMENTS

Hereinafter, a vehicular peripheral surveillance device according to an embodiment of the invention will be described with reference to the drawings.

In a first embodiment of the invention, a vehicular peripheral surveillance device for a vehicle of the invention is applied to a radar cruise control system. The radar cruise control system is also referred to as an ACC (Adaptive Cruise Control) system, performs ACC control such that a host vehicle travels in accordance with either a set vehicle speed or a set inter-vehicle distance (inter-vehicle time) to a preceding vehicle, and supports the driving operation of a driver.

Figure 1:
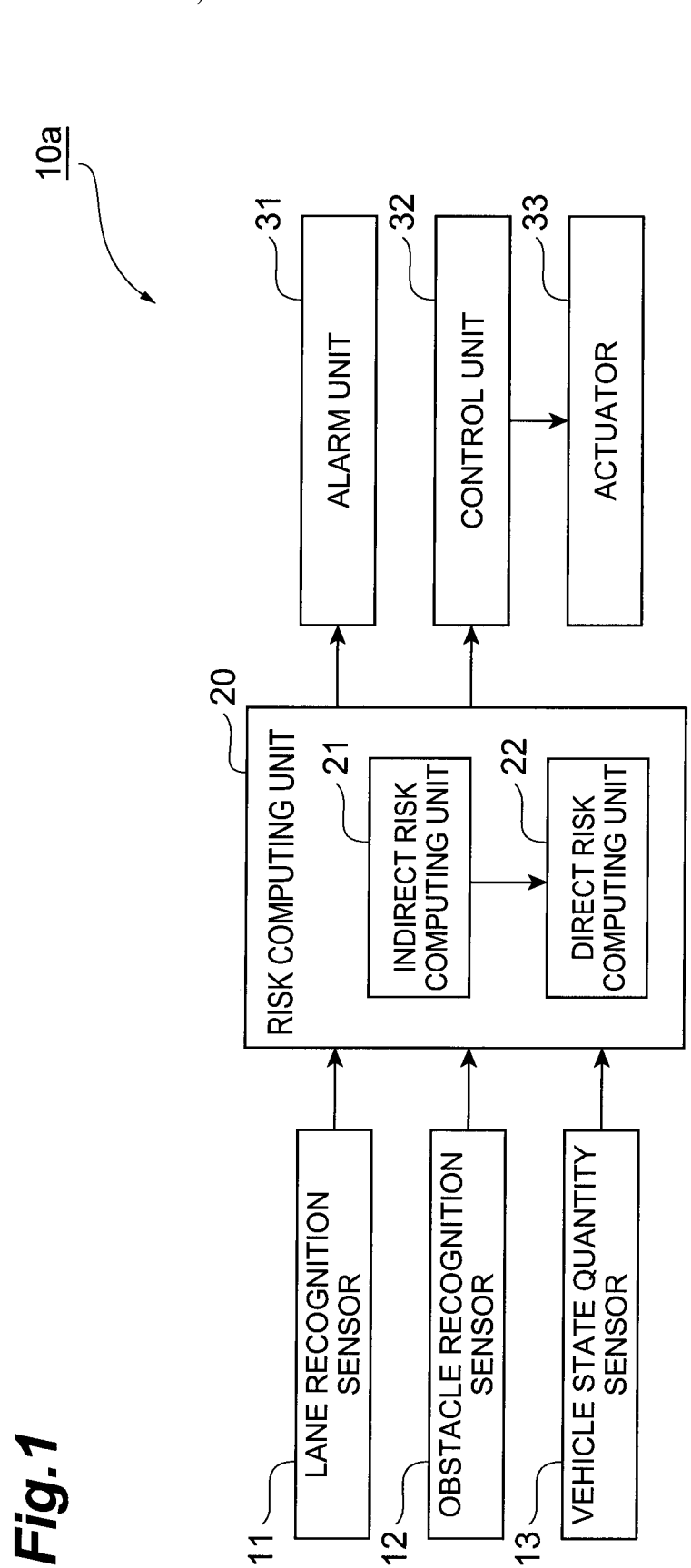
FIG. 1 is a block diagram showing the configuration of a radar cruise control system according to a first embodiment.

As shown in FIG. 1, a radar cruise control system 10a of the first embodiment includes a lane recognition sensor 11, an obstacle recognition sensor 12, a vehicle state quantity sensor 13, a risk computing unit 20, an alarm unit 31, a control unit 32, and an actuator 33. The respective units are connected to each other through an in-vehicle LAN or the like.

The lane recognition sensor 11 recognizes a lane marking (hereinafter, referred to as a white line) on a road. Specifically, the lane recognition sensor 11 is an image sensor, such as a camera. Meanwhile, for the lane recognition sensor 11, a laser radar or the like may be used.

The obstacle recognition sensor 12 recognizes an obstacle, such as another vehicle, which is around the host vehicle. Specifically, the obstacle recognition sensor 12 is a millimeter-wave radar. Meanwhile, for the obstacle recognition sensor 12, an image sensor, such as a camera, a laser radar, or the like may be used.

The vehicle state quantity sensor 13 detects the state quantity of a vehicle, such as the vehicle speed, acceleration, yaw rate, and steering angle of the host vehicle, and the position of the host vehicle. Specifically, the vehicle state quantity sensor 13 is a vehicle speed sensor, an acceleration sensor, a yaw rate sensor, a steering angle sensor, a GPS (Global Positioning System), and the like.

The risk computing unit 20 predicts the movement of an obstacle around the host vehicle on the basis of information detected by the lane recognition sensor 11, the obstacle recognition sensor 12, and the vehicle state quantity sensor 13, and computes a risk of the obstacle to the host vehicle on the basis of the predicted movement of the obstacle.

The risk computing unit 20 has an indirect risk computing unit 21 and a direct risk computing unit 22. As described below, the indirect risk computing unit 21 predicts the movement of an obstacle, such as another vehicle, as an indirect risk object having no risk of being in direct contact with the host vehicle or the like.

As described below, the direct risk computing unit 22 predicts the movement of an obstacle, such as another vehicle, as a direct risk object having a risk of being in direct contact with the host vehicle or the like taking into consideration the movement of an indirect risk object predicted by the indirect risk computing unit 21. The direct risk computing unit 22 computes a risk to the host vehicle by a direct risk object whose movement is predicted.

The alarm unit 31 notifies an alarm to the driver of the host vehicle in accordance with the risk of the obstacle computed by the risk computing unit 20. Specifically, for the alarm unit 31, a buzzer, a lamp, a speaker, a display, or the like may be used.

The control unit 32 drives the actuator 33 in accordance with the risk of the obstacle computed by the risk computing unit 20, and controls the vehicle speed, acceleration, steering angle, or the like of the host vehicle. Specifically, the actuator 33 is a throttle actuator, a brake actuator, a steering actuator, or the like.

Hereinafter, the operation of the radar cruise control system 10a of this embodiment will be described. In this embodiment, for the sake of supporting safe traveling of the host vehicle, a risk area is computed from a peripheral situation. An appropriate safety area is obtained from the computed risk area, and the driving operation of the driver is supported such that the host vehicle is constantly kept in the safety area.

Figure 2:
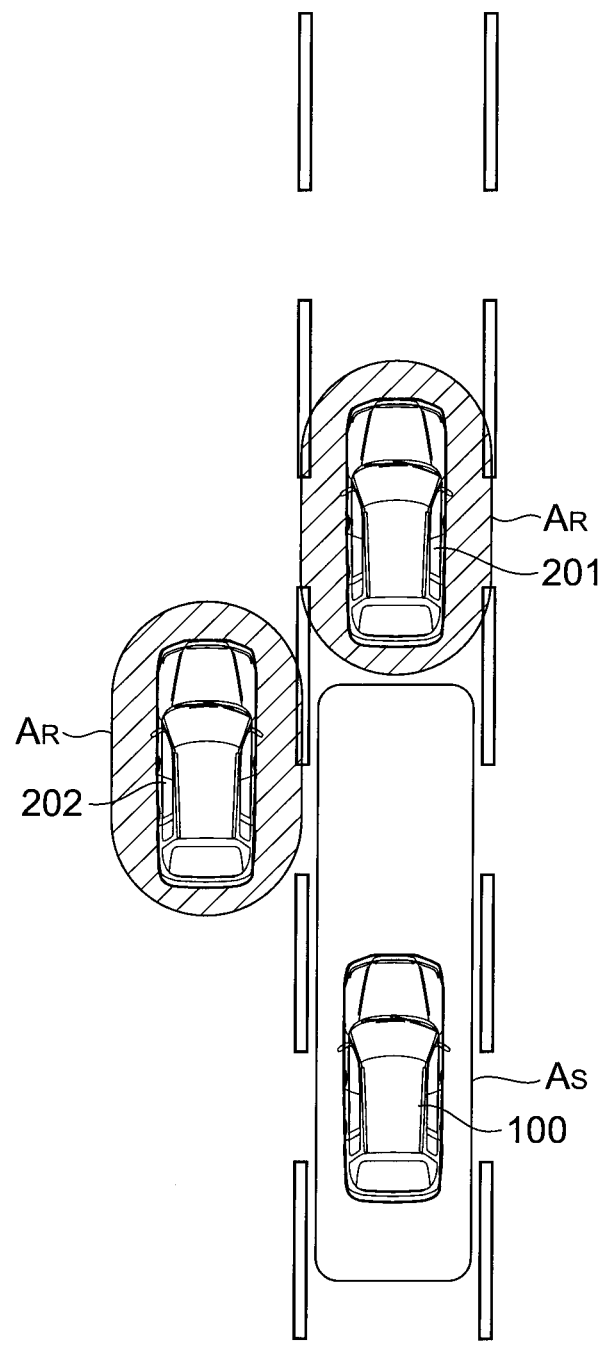
FIG. 2 is a plan view showing a safety area and a risk area around a host vehicle.

As shown in FIG. 2, a safety area $A_S$ means an area where a host vehicle 100 can travel safely, excluding a risk area $A_R$ which is defined by other vehicles 201 and 202 around the host vehicle 100, buildings around the traveling area of the host vehicle 100, lane markings based on the traffic rules, and the like. The risk area $A_R$ moves or expands with a change in the situation around the host vehicle 100, and when the safety area $A_S$ of the host vehicle 100 is eroded, it is necessary to control the traveling state of the host vehicle 100 so as to ensure the necessary safety area $A_S$.

For examples, in an example of FIG. 2, when the safety area $A_S$ in front of the host vehicle 100 decreases with deceleration of another vehicle (preceding vehicle) 201 in front of the host vehicle 100, it is necessary that the host vehicle 100 also decelerates to ensure a sufficient safety area $A_S$ in front of the host vehicle 100.

The risk area $A_R$ is obtained from a normal risk which depends on the current states of peripheral vehicles and the road environment and an oncoming risk which is predicted on the basis of the current states (speed or direction) of the peripheral vehicles. However, since an oncoming risk is obtained from current physical information, it is difficult to predict a potential risk which does not appear in motion. For this reason, when abrupt cutting, abrupt deceleration, or the like of another vehicle 200 occurs, there is a possibility that it is difficult to sufficiently cope with this situation.

Accordingly, in this embodiment, before actual physical information is obtained, a risk of the oncoming motion of a peripheral vehicle or a new obstacle having not been currently detected is predicted to obtain an oncoming risk. That is, in this embodiment, from the point of view of another vehicle 201 or the like around the host vehicle 100, a risk around another vehicle 201 or the like is obtained to predict the oncoming action of another vehicle 201 or the like. Thus, an oncoming risk area $A_R$ around the host vehicle 100 is predicted, and the safety area $A_S$ of the host vehicle 100 is newly obtained.

Figure 3:
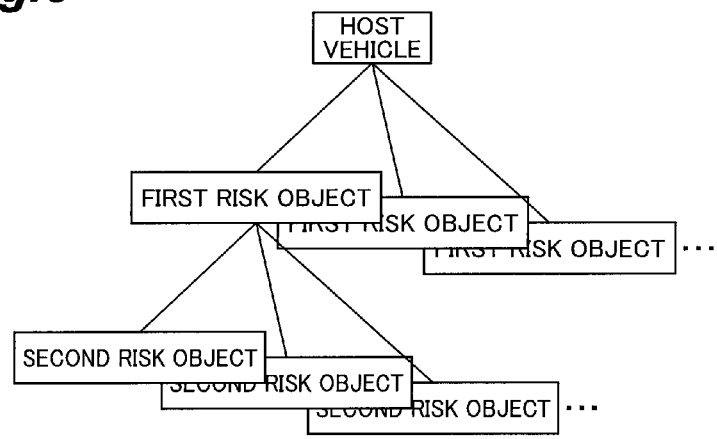
FIG. 3 is a diagram showing a procession of first risk objects and second risk objects around a host vehicle.
Figure 4:
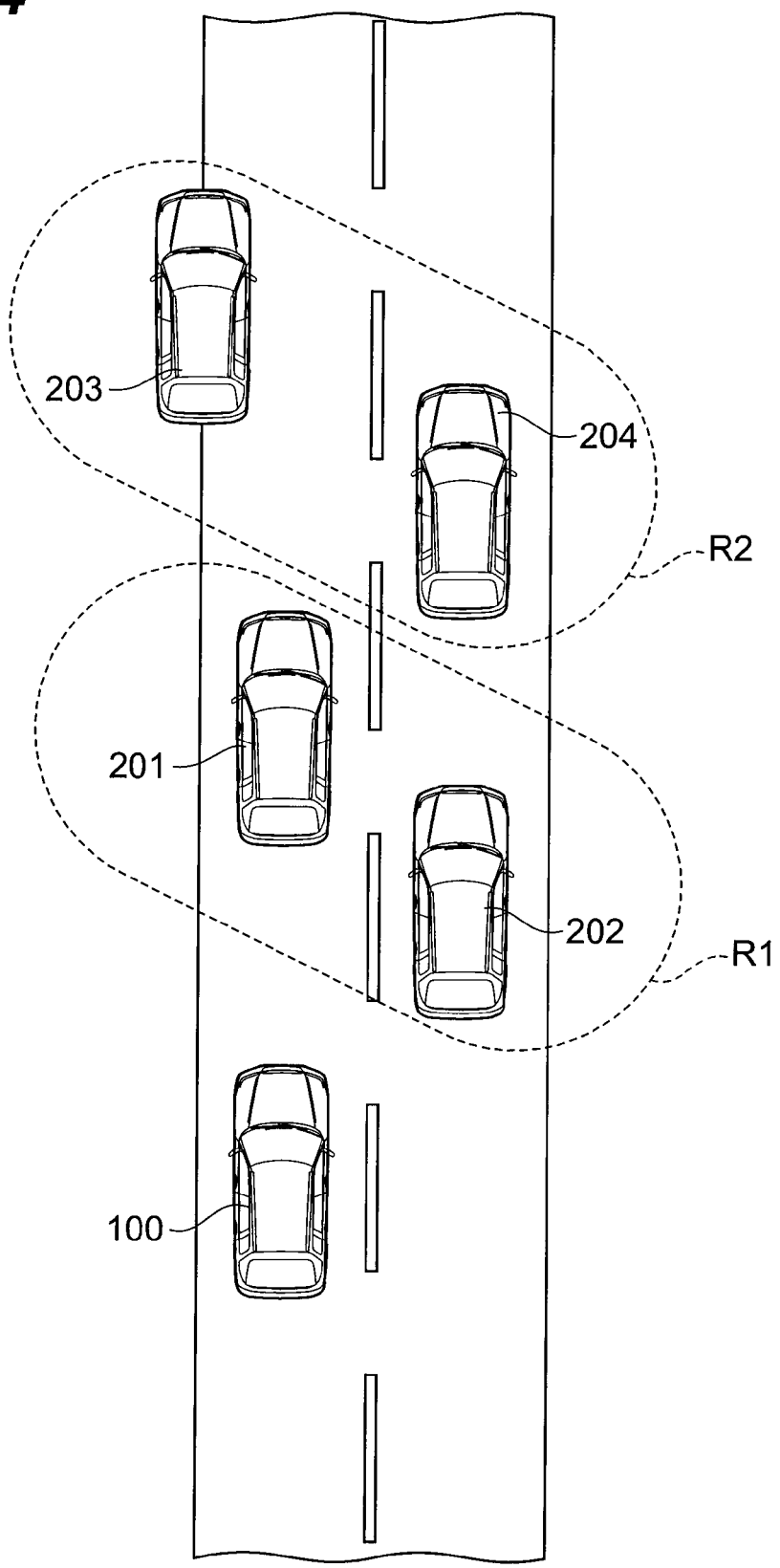
FIG. 4 is a plan view showing other vehicles as first risk objects and second risk objects around a host vehicle.

As shown in FIG. 3, risks are sequentially computed in processions from a second risk object to a first risk object around the host vehicle 100, making it possible to predict a reliable oncoming risk area $A_R$ around the host vehicle 100. As shown in FIG. 4, a first risk object R1 includes other vehicles 201 and 201 closest to the host vehicle 100 in respective ways around the host vehicle 100. A second risk object R2 includes other vehicles 203 and 204 which are more distant from the host vehicle 100 than the first risk objects R1 and closest to other vehicles 203 and 204 in respective ways as peripheral vehicles viewed from other vehicles 201 and 202 of the first risk object R1.

The risk object R1 and the like includes objects, such as people, bicycles, motorcycles, and structures, which exist on or around a road to cause an accident, in addition to the vehicles. The risk object R1 and the like may be moving or may be stationary, like a vehicle which is parked. For an arbitrary natural number n, the risk area $A_R$ can be obtained on the basis of the traveling state of the host vehicle 100, the state of the traveling environment of the host vehicle 100, and the state of the driver of the host vehicle 100 with respect to the first risk object R1 to the n-th risk object Rn.

Figure 5:
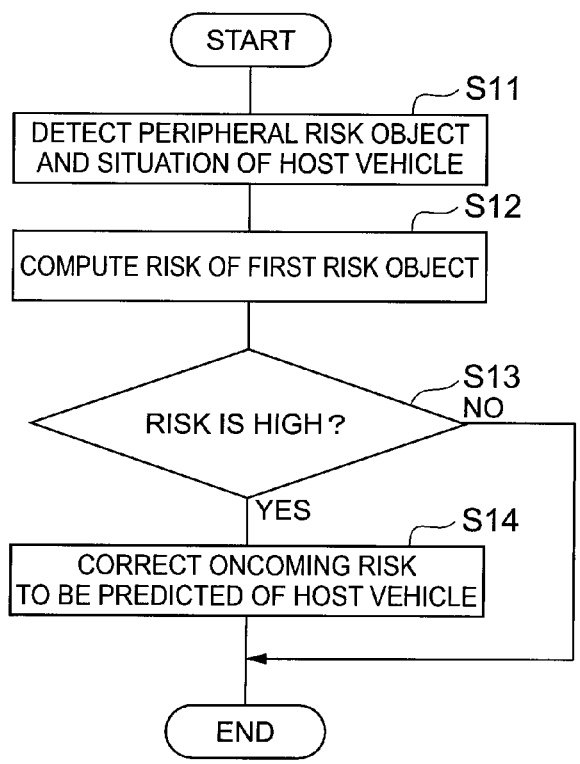
FIG. 5 is a flowchart showing the operation of the radar cruise control system according to the first embodiment.

As shown in FIG. 5, when the host vehicle 100 is traveling, the risk computing unit 20 detects risk objects around the host vehicle 100 and the situation of the host vehicle 100 by the lane recognition sensor 11, the obstacle recognition sensor 12, and the vehicle state quantity sensor 13 (S11). The lane recognition sensor 11 recognizes a lane in which the host vehicle 100 is traveling and the position of the host vehicle 100 in the lane on the basis of the output of the image sensor. Thus, a risk of lane departure of the host vehicle 100 is computed. The steps of FIG. 5 are repeatedly performed for every 10 milliseconds or one second while the host vehicle 100 is traveling.

The obstacle recognition sensor 12 recognizes an obstacle around the host vehicle 100. Physical information regarding the relative speed, relative distance, relative acceleration, or the like to the obstacle is acquired taking into consideration the speed, acceleration, yaw rate, and steering angle of the host vehicle 100, the current position of the host vehicle 100, and the like detected by the vehicle state quantity sensor 13. How the obstacle approaches the host vehicle 100 is obtained from these kinds of information, thereby computing a risk of the obstacle being in contact with the host vehicle 100.

As a risk of the obstacle being in contact with the host vehicle 100, TTC (Time To Collision: a value obtained by dividing a relative distance by a relative speed) is used. A threshold value is set for the TTC in a stepwise manner, and a risk level is determined in accordance with the threshold value. When computing a risk, computation may be carried out simply using the relative distance or relative speed to the obstacle, the size of the obstacle, or the like, in addition to the TTC.

Figure 6:
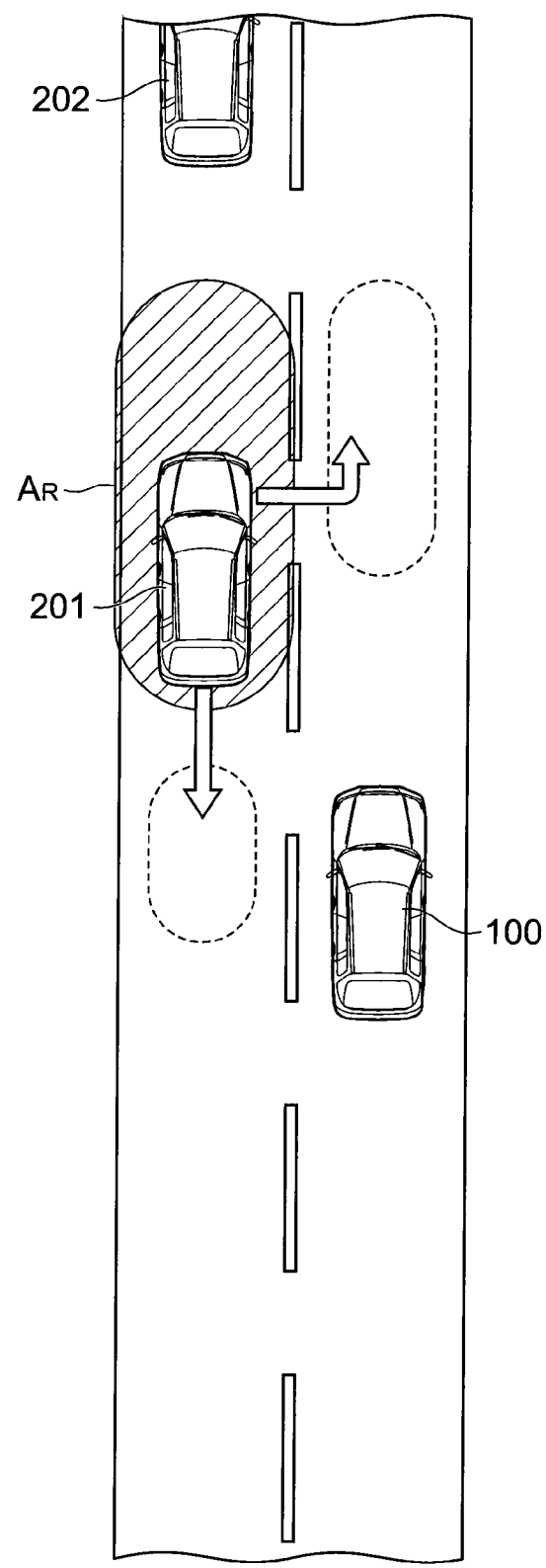
FIG. 6 is a plan view showing a current risk area when viewed from a host vehicle.

The risk computing unit 20 computes a risk of the first risk object R1 (S12). As shown in FIG. 6, it is assumed that another vehicle 201 is traveling in a lane adjacent to the traveling lane of the host vehicle 100 in front of the host vehicle 100. Another vehicle 202 which is traveling in the same lane is in front of another vehicle 201. The risk computing unit 20 recognizes another vehicle 201 as the first risk object R1 by the obstacle recognition sensor 12, and recognizes another vehicle 202 as the second risk object R2. The indirect risk computing unit 21 of the risk computing unit 20 computes a risk to an obstacle around another vehicle 201 and a risk to the traveling environment of another vehicle 201 from the point of view of another vehicle 201 as the first risk object R1.

As shown in FIG. 6, when another vehicle 201 as the first risk object R1 approaches another vehicle 202 as the second risk object R2, and a risk in front of another vehicle 201 increases (S13), the indirect risk unit 21 estimates there is an increasing probability that the oncoming action of another vehicle 201 as the first risk object R1 is deceleration in the same lane or a lane change to an adjacent lane.

Figure 7:
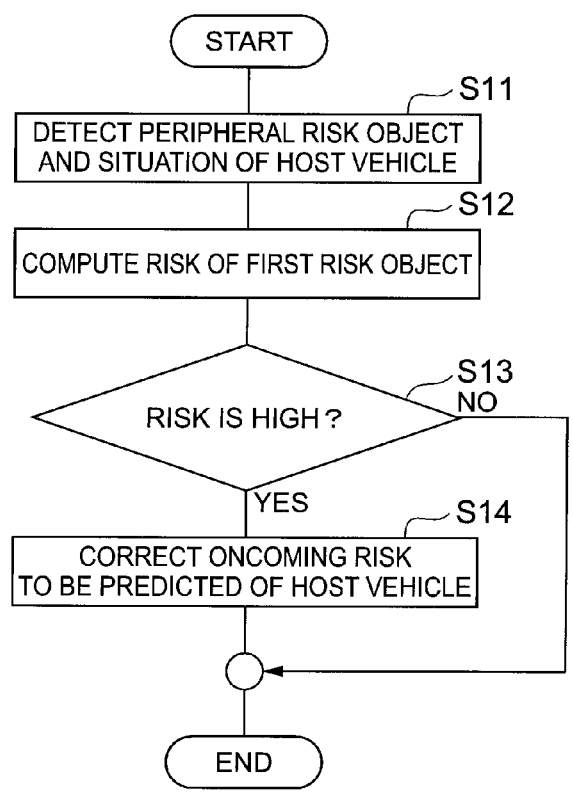
FIG. 7 is a plan view showing an oncoming risk area taking into consideration movement of another vehicle.

The direct risk computing unit 22 of the risk computing unit 20 substitutes the computation result of the indirect risk unit 21 with the point of view of the host vehicle 100, and predicts that another vehicle 201 as the first risk object R1 approaches the left side of the host vehicle 100 or cuts in front of the host vehicle 100. Accordingly, as shown in FIG. 7, the direct risk computing unit 22 corrects the oncoming risk area $A_R$ to be predicted of the host vehicle 100 to a risk area $A_R'$ on the basis of the prediction (S14). In FIG. 7, taking into consideration of the oncoming risk area $A_R$ to be predicted, it is necessary to perform traveling support to suppress a lane change of the host vehicle 100 to the left lane or acceleration in front of the host vehicle 100. Accordingly, the risk computing unit 20 suppresses a lane change of the host vehicle 100 to the left lane or acceleration in front of the host vehicle 100 by a notification in the alarm unit 31 or traveling control of the host vehicle 100 in the control unit 32.

According to this embodiment, the vehicular peripheral surveillance device includes the obstacle recognition sensor 12 which monitors an obstacle around the host vehicle 100, the lane recognition sensor 11 and the vehicle state quantity sensor 13 which detect the traveling state of the host vehicle 100, and the risk computing unit 20 which predicts the movement of the obstacle using information acquired by the obstacle recognition sensor 12, and computes a risk of the obstacle to the host vehicle 100 on the basis of the predicted movement of the obstacle. The risk computing unit 20 changes the prediction range of the movement of the obstacle on the basis of the traveling state of the host vehicle 100 detected by the lane recognition sensor 11 and the vehicle state quantity sensor 13. Therefore, the movement of the obstacle is predicted taking into consideration the situation of the host vehicle 100, thereby realizing computation with high precision while reducing a computation load.

According to this embodiment, the risk computing unit 20 sequentially predicts the movement of the obstacle as the first risk object R1 close to the host vehicle in processions on the basis of the movement of the obstacle as the second risk object R2 distant from the host vehicle, making it possible to realize computation with higher precision.

Figure 8:
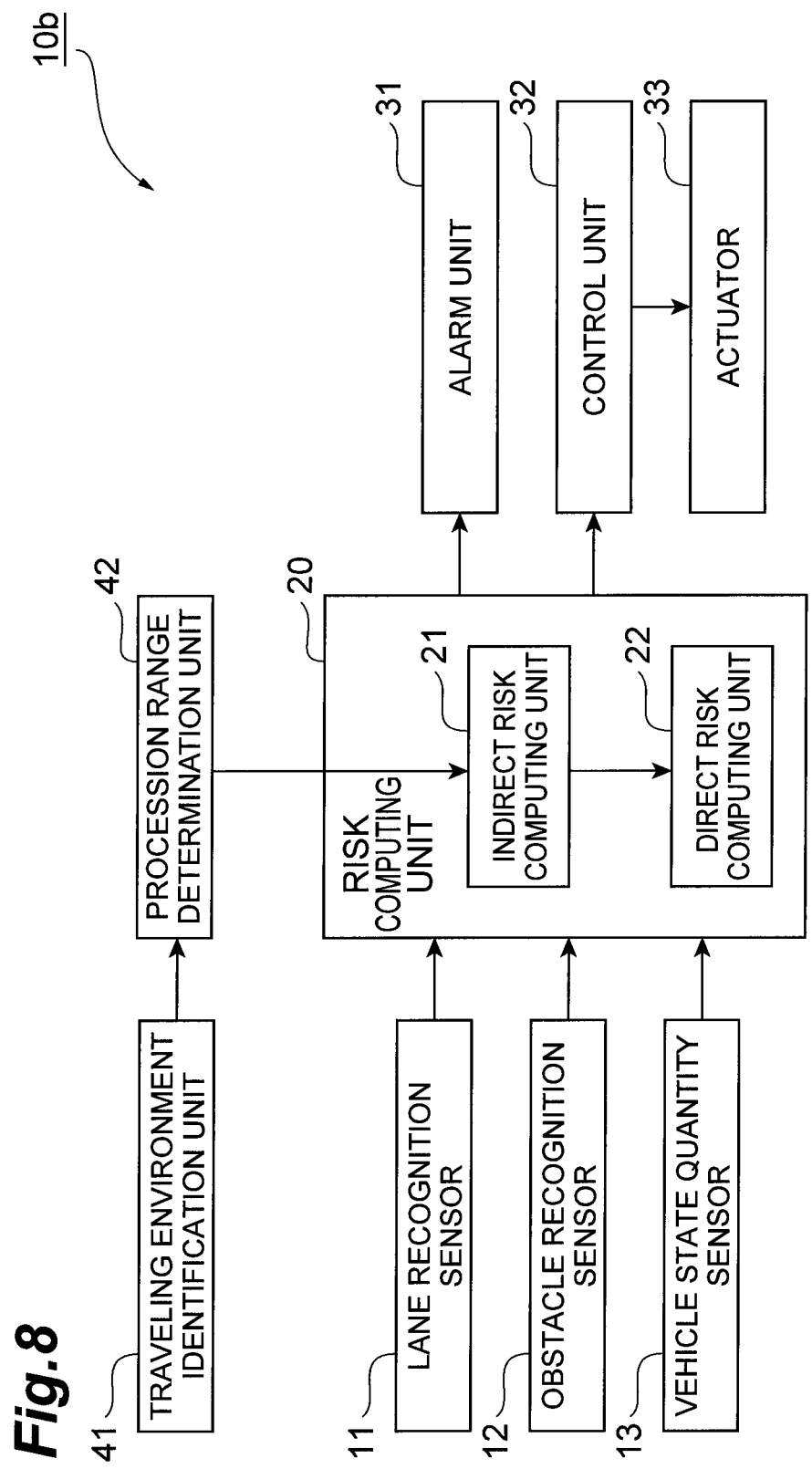
FIG. 8 is a block diagram showing the configuration of a radar cruise control system according to a second embodiment.

A second embodiment of the invention will be described. As shown in FIG. 8, a radar cruise control system 10b of this embodiment has a traveling environment identification unit 41 which identifies the traveling environment of the host vehicle 100, and a procession range determination unit 42 which determines the number of processions when risks of peripheral vehicles are computed in processions.

The traveling environment identification unit 41 should identify how complex peripheral vehicles including the host vehicle 100 change. For this reason, the traveling environment identification unit 41 identifies and outputs a road type on which the host vehicle 100 or a peripheral vehicle is traveling. As shown in FIG. 9, an integer is assigned in advance to each road type as the maximum number of processions. The traveling environment identification unit 41 outputs an integer corresponding to the identified road type. The traveling environment identification unit 41 may identify information regarding a time zone, weather, traffic jams information, a specific area, and the like as the traveling environment of the host vehicle 100, in addition to the road type of FIG. 9, and may similarly output an integer assigned to each identified time zone as the maximum number of processions.

The procession range determination unit 42 outputs an appropriate number of processions in accordance with a peripheral situation with the output value of the traveling environment identification unit 41 as the maximum number of processions. For example, even when the maximum number of processions output from the traveling environment identification unit 41 is "2" corresponding to a public road in an urban area of FIG. 9, when the inter-vehicle distance between another vehicle 201 as the first risk object R1 and another vehicle 202 as the second risk object R2 is long, "1" is set as the number of processions.

As in the first embodiment, the risk computing unit 20 computes a risk of an obstacle around the host vehicle 100 in accordance with the number of processions determined by the procession range determination unit 42. For example, when the number of processions determined by the procession range determination unit 42 is "2", the risk computing unit 20 computes risks of the third to first risk objects in processions to compute a risk of the first risk object R1. When the number of processions determined by the procession range determination unit 42 is "1", the risk computing unit 20 computes risks of the second to first risk objects in processions to compute a risk of the first risk object R1.

According to this embodiment, the risk computing unit 20 changes the procession range, which is the use range of information acquired by the obstacle recognition sensor 12, on the basis of the state of the traveling environment of the host vehicle 100 detected by the traveling environment identification unit 41. Therefore, it is possible to prevent the information acquired by the obstacle recognition sensor 12 from being redundantly used, thereby realizing computation with higher precision while further reducing a computation load.

In particular, according to this embodiment, the risk computing unit 20 sequentially predicts the movement of the obstacles as the n-th to first risk objects while changing the procession range on the basis of the state of the traveling environment of the host vehicle 100 detected by the traveling environment identification unit 41. Therefore, the prediction range of the movement of the obstacles in processions from an obstacle distant from the host vehicle 100 changes depending on the traveling environment of the host vehicle 100, thereby realizing computation higher precision while further reducing a computation load.

Figure 10:
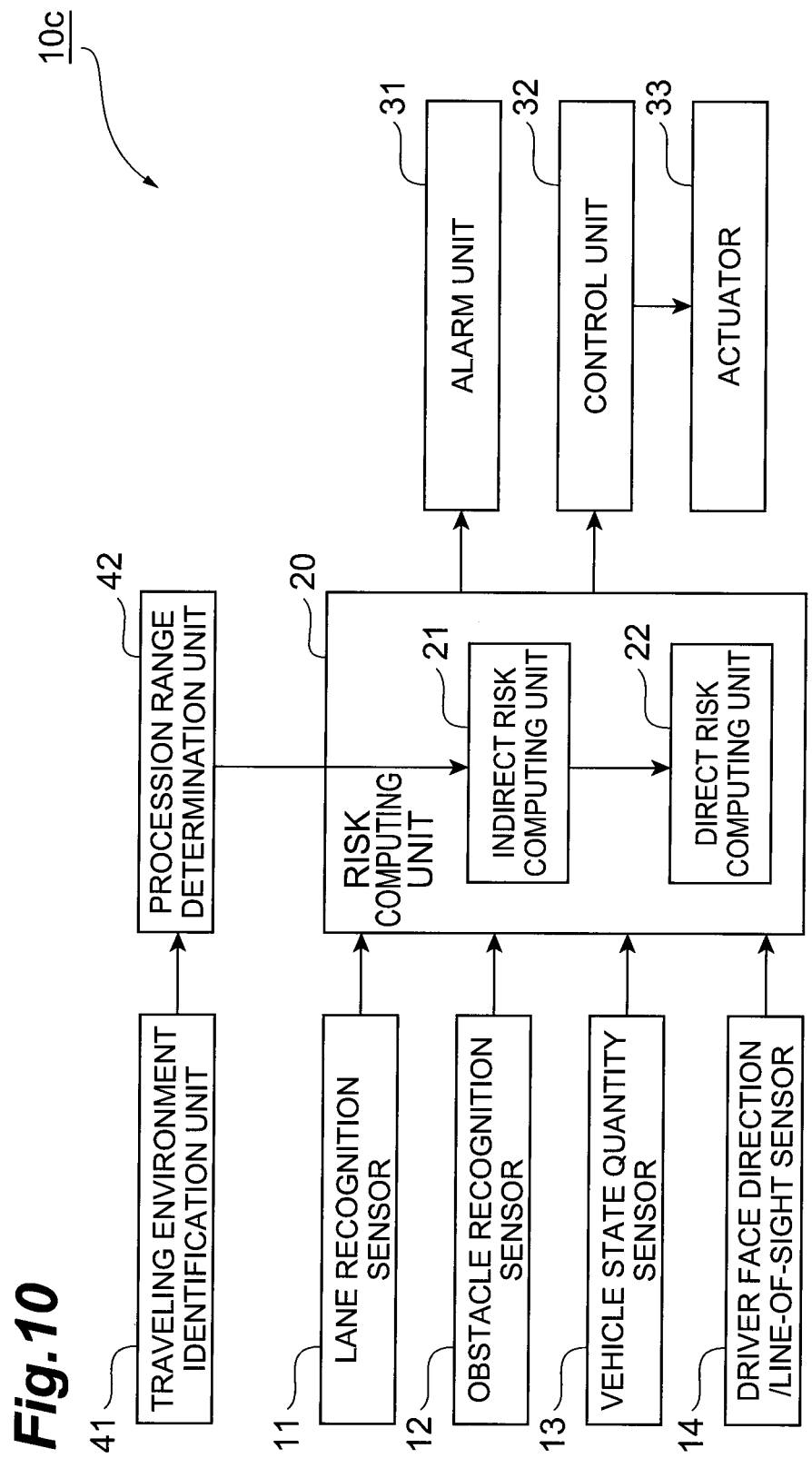
FIG. 10 is a block diagram showing the configuration of a radar cruise control system according to a third embodiment.

Hereinafter, a third embodiment of the invention will be described. As shown in FIG. 10, a radar cruise control system 10c of this embodiment includes a driver face direction/line-of-sight sensor 14. Specifically, the driver face direction/line-of-sight sensor 14 is a sensor which performs pattern recognition on the image of the head of the driver captured by a camera or the like and detects the ocular motion and the line of sight of the driver.

Figure 11:
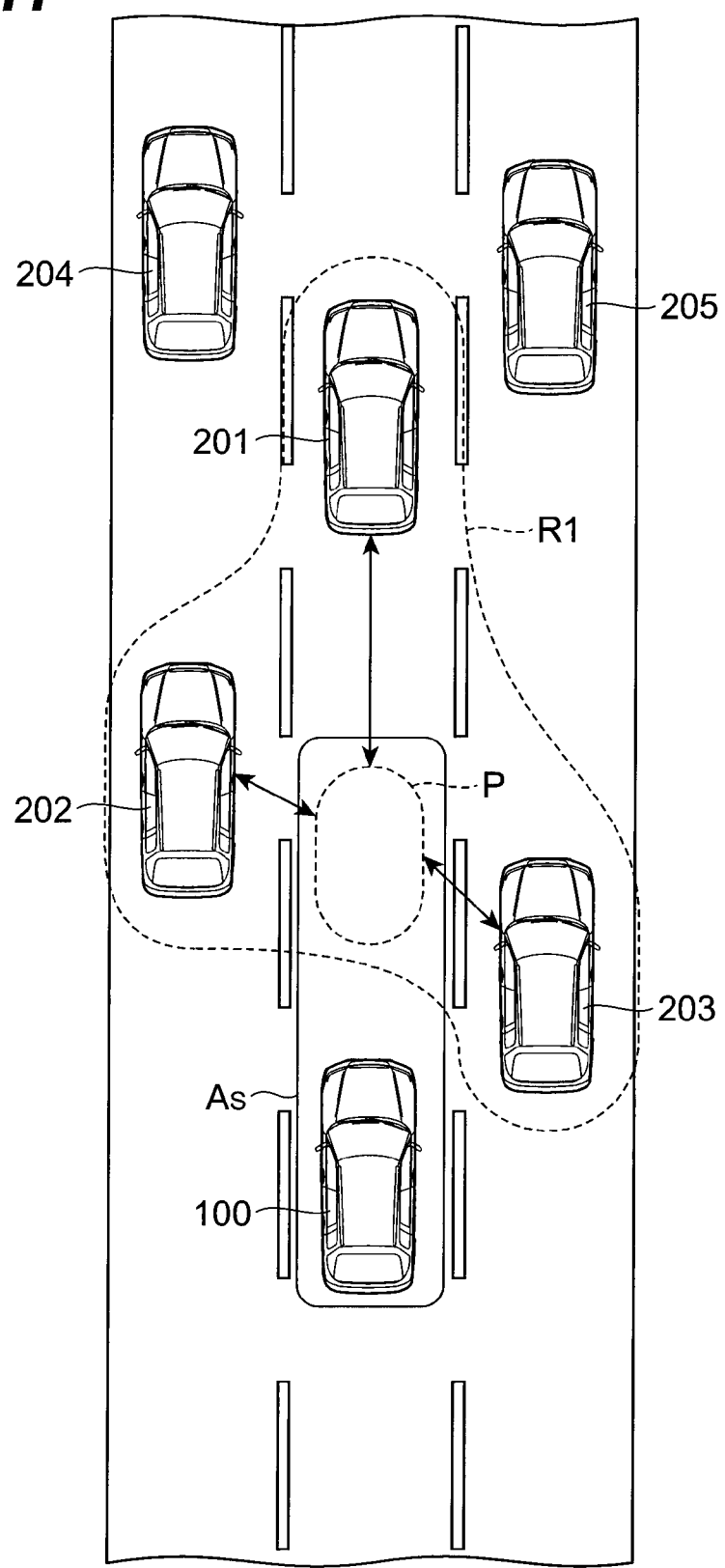
FIG. 11 is a plan view showing a priority determination direction on another vehicle according to the third embodiment.

As shown in FIG. 11, when there are a plurality of other vehicles 201 to 205 around the host vehicle 100, in the radar cruise control system 10c of this embodiment, the risk computing unit 20 sets priority on other vehicles 201 to 203 as the first risk object R1 in order of the need for carefully predicting an action.

The shorter the relative distance to a position P of the host vehicle 100 after a predetermined time elapses is short, and the higher the relative speed when approaching the host vehicle 100, the higher the priority. The nearer the line of sight of the driver detected by the driver face direction/line-of-sight sensor 14, the lower the priority, and the farther the line of sight, the higher the priority. The position P of the host vehicle 100 after the predetermined time elapses changes depending on the vehicle speed of the host vehicle 100 detected by the vehicle state quantity sensor 13, the road type, on which the host vehicle 100 is traveling, detected by the traveling environment identification unit 41, or the like.

As in the first and second embodiments, the risk computing unit 20 computes risks of obstacles around the host vehicle 100 while changing the number of processions in accordance with the set priority. For example, when the number of processions determined by the procession range determination unit 42 is "1", the risk computing unit 20 changes the number of processions to "2" for another vehicle 202 at a short distance from the host vehicle 100, and sequentially computes risks of the third to first risk objects in processions to compute a risk of another vehicle 202. For another vehicle 201 which is at a long distance from the host vehicle 100 and on the line of sight of the driver, the risk computing unit 20 changes the number of processions to "0" and computes only a risk of another vehicle 201.

According to this embodiment, when the obstacle recognition sensor 12 monitors a plurality of obstacles, the risk computing unit 20 sets priority on the obstacles on the basis of the traveling state of the host vehicle 100 detected by the vehicle state quantity sensor 13 and the line of sight of the driver of the host vehicle 100 detected by the driver face direction/line-of-sight sensor 14, and predicts the movement of the obstacles in accordance with the priority. Therefore, even when the obstacle recognition sensor 12 is monitoring a plurality of obstacles, it is possible to prevent the information acquired by the obstacle recognition sensor 12 from being redundantly used, thereby realizing computation with higher precision while further reducing a computation load.

According to this embodiment, the risk computing unit 20 sets priority on a plurality of first risk objects R1 around the host vehicle 100 on the basis of the traveling state of the host vehicle 100 detected by the vehicle state quantity sensor 13 and the line of sight of the driver of the host vehicle 100 detected by the driver face direction/line-of-sight sensor 14, and sequentially predicts the movement of the obstacles as the n-th risk object to the first risk object while changing the number of processions in accordance with the priority. Therefore, even when a plurality of obstacles around the host vehicle 100, the prediction range of the movement of the obstacles in processions from an obstacle distant from the host vehicle 100 changes depending on the priority, thereby realizing computation with higher precision while further reducing a computation load.

In this embodiment, the risk computing unit 20 sequentially predicts the movement of the obstacles as the n-th risk object to the first risk object while setting the number of processions to be greater for an object as a first risk object R1 having high priority. Therefore, the prediction range of the movement of the obstacles in processions from an obstacle distant from the host vehicle 100 increases for an obstacle having high priority, thereby realizing computation with higher precision while further reducing a computation load.

Hereinafter, a fourth embodiment of the invention will be described. In this embodiment, it is assumed that a plurality of vehicles which are traveling nearby have the radar cruise control systems 10a to 10c of the first to third embodiments mounted therein, and have mounted therein communication devices which can perform vehicle-to-vehicle communication or road-to-vehicle communication. In this case, a plurality of vehicles transmit the results of risks computed by the radar cruise control systems 10a to other vehicles. Thus, a plurality of vehicles can share the computed risks.

When there is another vehicle 202 or the like determined a risk is at a high level with respect to another vehicle 201 or the like as a first risk object of the host vehicle 100, as in first embodiment, the risk computing unit 20 increases an oncoming risk to the host vehicle 100.

According to this embodiment, the risk computing unit 20 predicts the movement of another vehicle 201 or the like on the basis of information received from another vehicle 201 or the like by the communication device which can perform vehicle-to-vehicle communication or road-to-vehicle communication. Therefore, the movement of another vehicle 201 or the like is predicted using information acquired by the host vehicle 100 and information from another vehicle 201 or the like together, thereby realizing computation with higher precision while further reducing a computation load.

Figure 12:
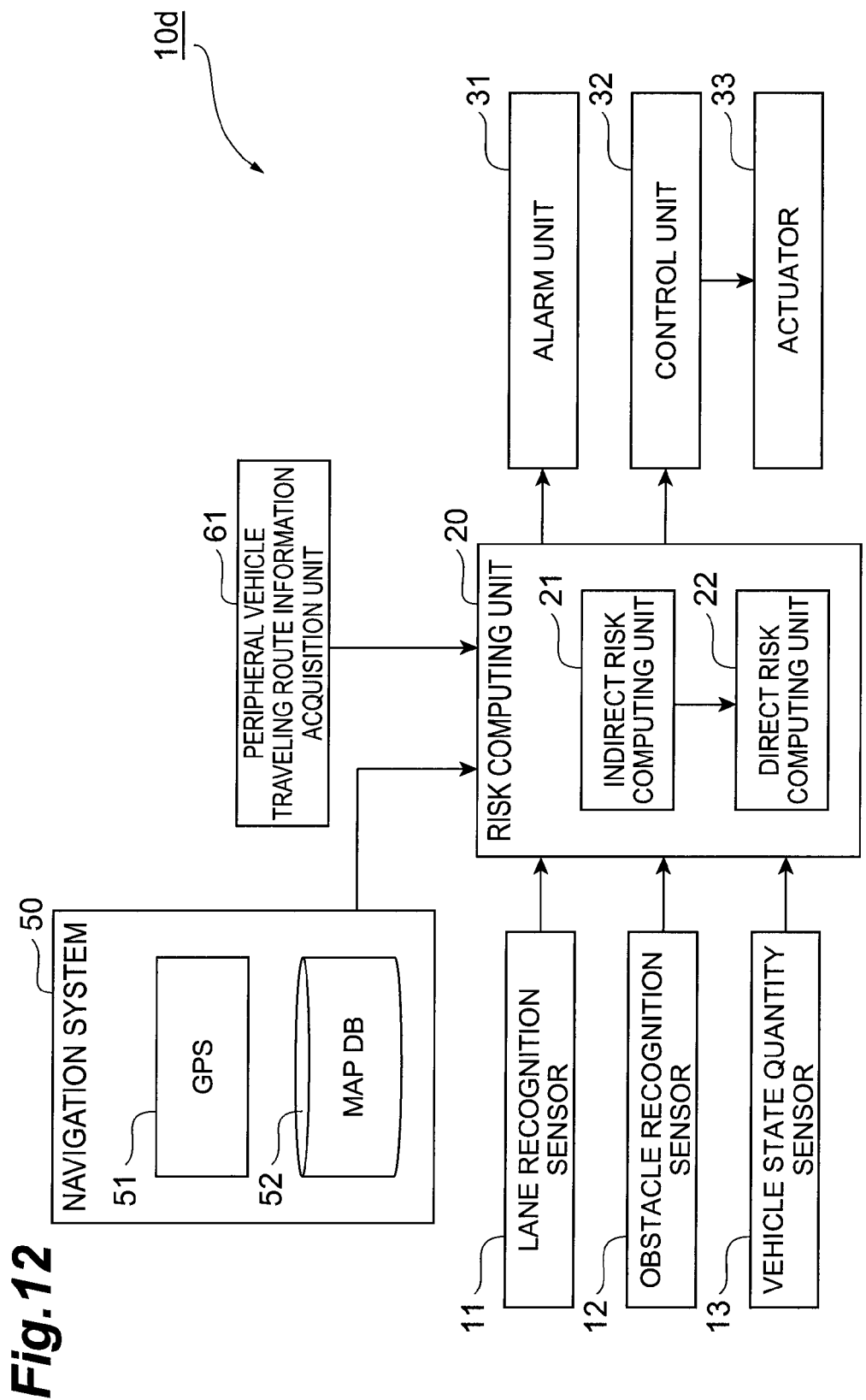
FIG. 12 is a block diagram showing the configuration of a radar cruise control system according to a fifth embodiment.

Hereinafter, a fifth embodiment of the invention will be described. As shown in FIG. 12, a radar cruise control system 10d of this embodiment includes a navigation system 50 which has a GPS 51 and a map DB 52. The radar cruise control system 10d also includes a peripheral vehicle traveling route information acquisition unit 61.

Figure 13:
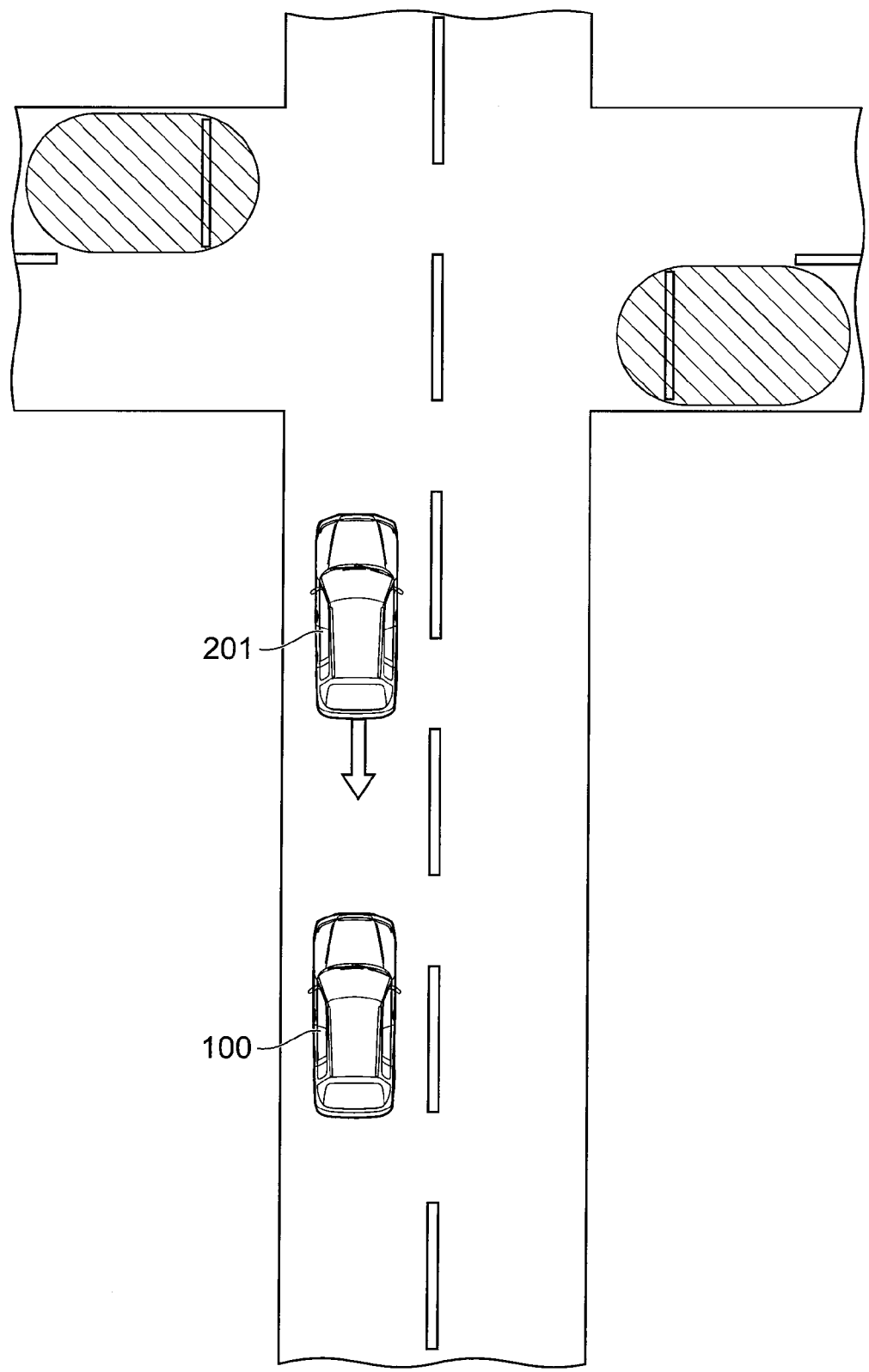
FIG. 13 is a plan view showing a method of predicting movement of another vehicle on the basis of information regarding a road shape according to the fifth embodiment.

As shown in FIG. 13, the navigation system 50 can acquire information regarding an intersection in front of the host vehicle 100 as road information by the map DB 52. The risk computing unit 20 predicts the timing at which another vehicle 201 passes through the intersection on the basis of the relative distance between the host vehicle 100 and another vehicle 201 as the first risk object R1 in front of the host vehicle 100, the relative speed, and the information regarding the intersection.

In this case, the risk computing unit 20 can predict that another vehicle 201 decelerates due to a vehicle entering the intersection. For this reason, the risk computing unit 20 controls the alarm unit 31 and the control unit 32 to increase a risk in front as an oncoming risk to the host vehicle 100 and to increase the inter-vehicle distance to another vehicle 201 longer than an area other than the intersection in advance.

Figure 14:
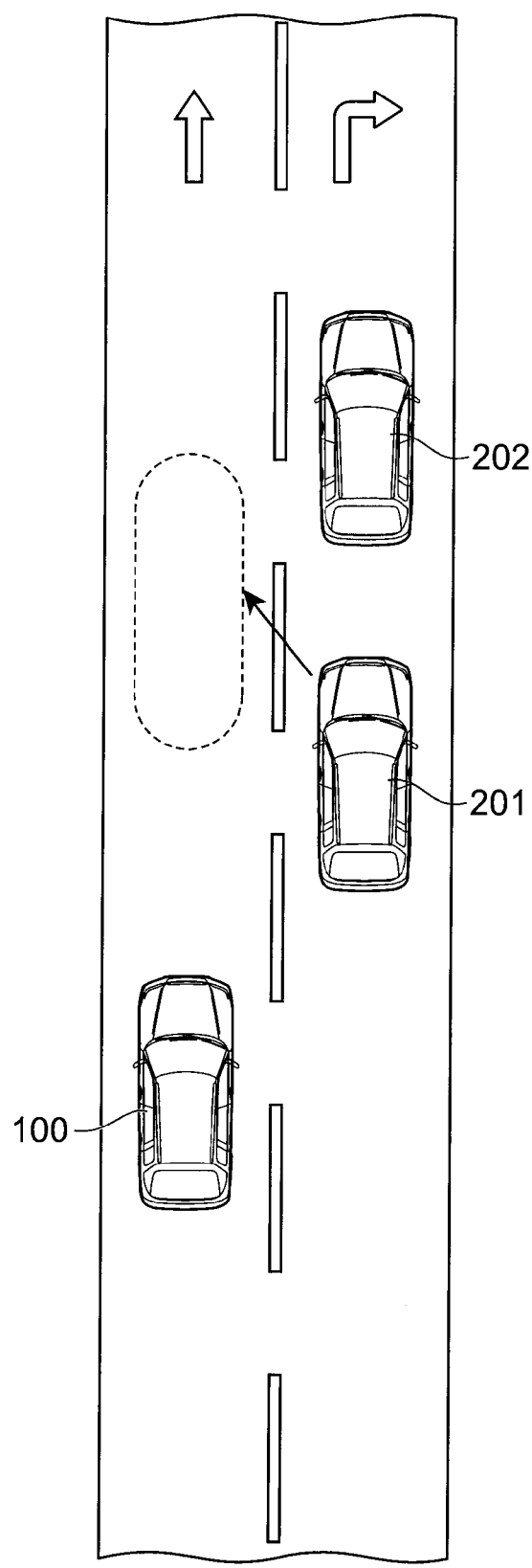
FIG. 14 is a plan view showing a method of predicting movement of another vehicle on the basis of information regarding the traveling plan of another vehicle according to the fifth embodiment.

The peripheral vehicle traveling route information acquisition unit 61 can receive the traveling plan of another vehicle 201 from another vehicle 201 through vehicle-to-vehicle communication or road-to-vehicle communication. In this case, as shown in FIG. 14, for example, when the peripheral vehicle traveling route information acquisition unit 61 acquires the traveling direction of the traveling plan of another vehicle 201 as a first risk object is straight, there is an increasing possibility that another vehicle 201 makes a lane change to the left lane. For this reason, the risk computing unit 20 controls the alarm unit 31 and the control unit 32 to increase an oncoming risk in front of the host vehicle 100 in advance and, if necessary, to decelerate the host vehicle 100.

According to this embodiment, the vehicular peripheral surveillance device further includes the navigation system 50 which acquires information regarding a road on which the host vehicle 100 is traveling. The risk computing unit 20 changes the prediction range of the movement of the obstacles on the basis of the information regarding the road, on which the host vehicle 100 is traveling, acquired by the navigation system 50. Therefore, it becomes possible to estimate the potential action of another vehicle 201 on the basis of information regarding lane ends, curves, or the like.

According to this embodiment, the navigation system 50 acquires information regarding a road shape around the host vehicle 100. The risk computing unit 20 predicts the movement of another vehicle 201 on the basis of the information acquired by the obstacle recognition sensor 12 and the information regarding the road shape around the host vehicle 100 acquired by the navigation system 50. Therefore, it becomes possible to estimate the potential action of another vehicle 201 on the basis of information regarding lane ends, curves, or the like.

According to this embodiment, the vehicular peripheral surveillance device further includes the peripheral vehicle traveling route information acquisition unit 61 which acquires information regarding a road on which another vehicle 201 will travel. The risk computing unit 20 predicts the movement of another vehicle 201 on the basis of the information regarding the road, on which another vehicle 201 will travel, acquired by the peripheral vehicle traveling route information acquisition unit 61. Therefore, it is possible to realize computation with higher precision while further reducing a computation load.

Although the embodiments of the invention have been described, the invention is not limited to the foregoing embodiments and various modifications may be made.

INDUSTRIAL APPLICABILITY

The invention can provide a vehicular peripheral surveillance device capable of realizing computation with high precision while reducing a computation load.

REFERENCE SIGNS LIST 10a to 10d: radar cruise control system
11: lane recognition sensor
12: obstacle recognition sensor
13: vehicle state quantity sensor
14: driver face direction/line-of-sight sensor
20: risk computing unit
21: indirect risk computing unit 22: direct risk computing unit
31: alarm unit
32: control unit
33: actuator
41: traveling environment identification unit
42: procession range determination unit
50: navigation system
51: GPS
52: map DB
61: peripheral vehicle traveling route information acquisition unit

The invention claimed is:

1. A vehicular peripheral surveillance device comprising:
a monitoring sensor which monitors an obstacle around a host vehicle;
a state detection unit which detects any one of a traveling state of the host vehicle, a state of the traveling environment of the host vehicle, and a state of the driver of the host vehicle; and
a risk computing unit which predicts a movement of the obstacle being monitored by the monitoring sensor using information acquired by the monitoring sensor, and computes a risk of the obstacle to the host vehicle on a basis of the predicted movement of the obstacle,
wherein the risk computing unit changes a prediction range of the movement of the obstacle on the basis of any one of the traveling state of the host vehicle, the state of the traveling environment of the host vehicle, and the state of the driver of the host vehicle detected by the state detection unit,
the risk computing unit sets a natural number n, predicts a movement of an n-th obstacle which is around an (n−1)th obstacle and more distant from the host vehicle than the (n−1)th obstacle and also predicts a movement of the (n−1)th obstacle on a basis of the predicted movement of the n-th obstacle, and sequentially predicts movement of (n−2)th to first obstacles on the basis of movement of (n−1)th to second obstacles in the same manner, and
the risk computing unit sets priority on a plurality of first obstacles around the host vehicle on the basis of any one of the traveling state of the host vehicle, the state of the traveling environment of the host vehicle, and the state of the driver of the host vehicle detected by the state detection unit, and sequentially predicts the movement of the n-th to first obstacles while changing the natural number n in accordance with the priority.

2. The vehicular peripheral surveillance device according to claim 1,
wherein the risk computing unit changes the use range of the information acquired by the monitoring sensor on the basis of any one of the traveling state of the host vehicle, the state of the traveling environment of the host vehicle, and the state of the driver of the host vehicle detected by the state detection unit.

3. The vehicular peripheral surveillance device according to claim 1,
wherein, when the monitoring sensor is monitoring a plurality of obstacles, the risk computing unit sets priority on the obstacles on the basis of any one of the traveling state of the host vehicle, the state of the traveling environment of the host vehicle, and the state of the driver of the host vehicle detected by the state detection unit, and predicts the movement of the obstacles in accordance with the priority.

4. The vehicular peripheral surveillance device according to claim 1,
wherein the risk computing unit sequentially predicts the movement of the n-th to first obstacles while changing the natural number n on the basis of any one of the traveling state of the host vehicle, the state of the traveling environment of the host vehicle, and the state of the driver of the host vehicle detected by the state detection unit.

5. The vehicular peripheral surveillance device according to claim 1,
wherein the risk computing unit sequentially predicts the movement of the n-th to first obstacles while setting the natural number n to be greater for a first obstacle having high priority.

6. The vehicular peripheral surveillance device according to claim 1, further comprising:
an other-vehicle information receiving unit which enables the reception of information from another vehicle as the obstacle,
wherein the risk computing unit predicts a movement of another vehicle on the basis of information received by the other-vehicle information receiving unit from another vehicle.

7. The vehicular peripheral surveillance device according to claim 1, further comprising:
a road information acquisition unit which acquires information regarding a road on which the host vehicle is traveling,
wherein the risk computing unit changes the prediction range of the movement of the obstacle on the basis of the information regarding the road, on which the host vehicle is traveling, acquired by the road information acquisition unit.

8. The vehicular peripheral surveillance device according to claim 1,
wherein the road information acquisition unit acquires information regarding a road shape around the host vehicle, and
the risk computing unit predicts the movement of the obstacle as another vehicle on the basis of information acquired by the monitoring sensor and the information regarding the road shape around the host vehicle acquired by the road information acquisition unit.

9. The vehicular peripheral surveillance device according to claim 8, further comprising:
a scheduled traveling information acquisition unit which acquires information regarding a road on which another vehicle will travel,
wherein the risk computing unit predicts a movement of another vehicle on the basis of the information regarding the road, on which another vehicle will travel, acquired by the scheduled traveling information acquisition unit.

* * * * *